(12) United States Patent  
Kim et al.

(10) Patent No.: US 8,948,762 B2  
(45) Date of Patent: Feb. 3, 2015

(54) APPARATUS FOR TRANSMITTING AND RECEIVING SIGNALS IN MULTI-NODE SYSTEM AND METHOD THEREOF

(75) Inventors: Heejin Kim, Seoul (KR); Inkyu Lee, Seoul (KR); Wookbong Lee, Anyang-si (KR); Jinsam Kwak, Anyang-si (KR)

(73) Assignees: LG Electronics Inc., Seoul (KR); Korea University Research and Business Foundation, Seoul (KR)

( * ) Notice: Subject to any disclaimer, the term of this patent is extended or adjusted under 35 U.S.C. 154(b) by 263 days.

(21) Appl. No.: 13/407,480

(22) Filed: Feb. 28, 2012

(65) Prior Publication Data

US 2012/0258723 A1 Oct. 11, 2012

Related U.S. Application Data

(60) Provisional application No. 61/472,638, filed on Apr. 7, 2011.

(51) Int. Cl.  
H04W 36/00 (2009.01)  
H04W 48/08 (2009.01)  
H04W 28/04 (2009.01)  
H04W 64/00 (2009.01)  
H04W 84/04 (2009.01)  
H04W 88/08 (2009.01)

(52) U.S. Cl.  
CPC ............ *H04W 48/08* (2013.01); *H04W 28/048* (2013.01); *H04W 64/00* (2013.01); *H04W 84/045* (2013.01); *H04W 88/08* (2013.01)  
USPC .......................... 455/437; 455/440; 455/444

(58) Field of Classification Search  
CPC ..... H04W 36/14; H04W 36/08; H04W 36/32; H04W 36/04; H04W 64/00; H04W 84/045  
USPC ......................................... 455/437, 440, 444  
See application file for complete search history.

(56) References Cited

U.S. PATENT DOCUMENTS

2011/0263242 A1* 10/2011 Tinnakornsrisuphap et al. .......................... 455/422.1  
2012/0094665 A1* 4/2012 Soliman et al. ............ 455/435.1

* cited by examiner

*Primary Examiner* — Omoniyi Obayanju  
(74) *Attorney, Agent, or Firm* — McKenna Long & Aldridge LLP

(57) ABSTRACT

In a multi-node system including a user equipment and a plurality of nodes connected to each other, a plurality of the nodes includes a $1^{st}$ node and a $2^{nd}$ node and the $1^{st}$ node allocates at least one portion of a plurality of the nodes to a user equipment. The present invention includes receiving a $1^{st}$ information on a location of the user equipment from the $2^{nd}$ node among a plurality of the nodes, determining a preset number of node candidates located close to the user equipment among a plurality of the nodes using the received $1^{st}$ information, and transmitting information on the node candidates to the user equipment to allocate at least one of the node candidates to the user equipment.

18 Claims, 10 Drawing Sheets

FIG. 6

TABLE I
MODE SELECTION BASED ON MINIMUM DISTANCE FOR THE DAS WITH
K USERS AND N DA PORTS

Set $D_0 = [u, \cdots, u_N]$ as the mode where each DA port serves
the nearest user with $N = N$.
for $m = 1 : 2^N - 1$
    Generate an N-digit dinary number b where each bit represents
    on/off for the corresponding DA port.
    b = binany ( m )
    for $i = 1 : N$
        $\tilde{u}_i \leftarrow 0$    if $b(i) = 0$ where $b(i)$ denotes the i-th bit of b.
        $\tilde{u}_i \leftarrow u_i$    if $b(i) = 1$
    end
    Add $[\tilde{u}_1, \cdots, \tilde{u}_N]$ to D    if the number of non-zero elements
                                              in the mode is greater than 1.
end
Set $(i^*, j^*) = \arg\min_i \min_j d_{i,j}$
Add $[i^*, \cdots, i^*]$ to D.

APPARATUS FOR TRANSMITTING AND RECEIVING SIGNALS IN MULTI-NODE SYSTEM AND METHOD THEREOF

Pursuant to 35 U.S.C. §119(a), this application claims the benefit of earlier filing date and right of priority to U.S. Application No. 61/472,638, filed on Apr. 7, 2011, the contents of which are hereby incorporated by reference herein in their entirety.

BACKGROUND OF THE INVENTION

1. Field of the Invention

The present invention relates to wireless communications, and more particularly, to an apparatus for transmitting and receiving signals in a multi-node system using a sum rate analysis and method thereof.

2. Discussion of the Related Art

Recently, a data traffic for a network within a wireless communication system is increasing rapidly in a wireless communication environment due to the advent and spread of various kinds of high data traffic requiring devices such as M2M devices having M2M (machine-to-machine) communications applied thereto, smart phones, tablet computers and the like. In order to meet such a massive data traffic, communication technologies are being developed into such a category to efficiently use more frequency bands as carrier aggregation technology, cognitive radio technology and the like and such a category to increase data capacity within a limited frequency as multi-antenna technology, multi-base station coordination technology and the like. And, a wireless communication environment is being evolved in a direction to increase density of nodes accessible around users. In particular, such a system equipped with high node density may provide enhanced system performance owing to inter-node coordination. This system may perform cooperative communications using a plurality of nodes each of which plays a role as a base station (e.g., advanced BS, Node-B, eNode-B, AP (access point), antenna, antenna group, RRH (radio remote header), RRH (radio remote unit), etc.).

As transmissions and receptions of all nodes are controlled by a single controller, if an individual node works as a partial antenna group of one base station, this system may be regarded as one DNS (distributed antenna system). In particular, a separate Node ID may be given to each individual node or may work as a partial antenna within a cell without a separate Node ID.

Meanwhile, if each node in DNS perform scheduling and handover with a different cell ID, it may be regarded as a multi-cell (e.g., macro cell, femto cell, pico cell, etc.) system. In case that multiple cells respectively formed by a plurality of nodes are configured in a manner of being overlaid in accordance with coverage, this may be named multi-tier network.

Meanwhile, base stations of various types may be used as nodes irrespective of their names, respectively. In particular, any one of BS (Base Station), NB (Node-B), eNB (eNode-B), pico-cell eNB (PeNB), Home eNB (HeNB), RRH, RRH, relay, repeater and the like may become a node. At least one antenna is installed at one node. In this case, an antenna may mean a physical antenna or one of an antenna port, a virtual antenna and an antenna group. And, a node may be called a point.

A node may normally indicate an antenna group spaced apart over a predetermined interval. And, a node may be applicable in case of meaning a random antenna group irrespective of interval. For instance, a base station may be defined to control a node consisting of H-pol antenna and a node consisting of V-pol antenna.

SUMMARY OF THE INVENTION

Accordingly, the present invention is directed to an apparatus for transmitting and receiving signals in a multi-node system using a sum rate analysis and method thereof that substantially obviate one or more problems due to limitations and disadvantages of the related art.

An object of the present invention is to provide an apparatus for transmitting and receiving signals in a multi-node system using a sum rate analysis and method thereof.

Technical tasks obtainable from the present invention may be non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a node allocating method in a multi-node system including a user equipment and a plurality of nodes connected to each other, in which a plurality of the nodes includes a $1^{st}$ node and a $2^{nd}$ node and in which the $1^{st}$ node allocates at least one portion of a plurality of the nodes to the user equipment, according to the present invention includes the steps of receiving a $1^{st}$ information on a location of the user equipment from the $2^{nd}$ node among a plurality of the nodes, determining a preset number of node candidates located close to the user equipment among a plurality of the nodes using the received $1^{st}$ information, and transmitting information on the node candidates to the user equipment to allocate at least one of the node candidates to the user equipment.

Preferably, the preset number is determined by a formula as follows: $N_c = 2^N - 1$, wherein the Nc and the N indicate the preset number and the number of a plurality of the nodes, respectively.

Preferably, a plurality of the nodes include a macro base station, a pico cell base station (PeNB), a home base station (HeNB), RRH (remote radio head), a relay node, an antenna and a distributed antenna group.

Preferably, the $1^{st}$ information does not contain instantaneous channel state information (CSI).

Preferably, the $1^{st}$ node includes a base station, the base station controls each of a plurality of the nodes, and each of a plurality of the nodes is connected with the base station by wire.

Preferably, the user equipment includes a plurality of user equipments.

In another aspect of the present invention, a node allocating method in a multi-node system including a user equipment and a plurality of nodes connected to each other, in which a plurality of the nodes include a $1^{st}$ node and a $2^{nd}$ node and in which the user equipment receives allocation of at least one portion of a plurality of the nodes from the $1^{st}$ node, according to the present invention includes the steps of transmitting a $1^{st}$ information on a location of the user equipment to the $2^{nd}$ node among a plurality of the nodes, receiving information on a preset number of node candidates located close to the user equipment among a plurality of the nodes from the $1^{st}$ node, and transceiving data with at least one of the node candidates.

Preferably, the preset number is determined by a formula as follows: $N_c=2^N-1$, wherein the Nc and the N indicate the preset number and the number of a plurality of the nodes, respectively.

Preferably, a plurality of the nodes include a macro base station, a pico cell base station (PeNB), a home base station (HeNB), RRH (remote radio head), a relay node, an antenna and a distributed antenna group.

Preferably, the $1^{st}$ information does not contain instantaneous channel state information (CSI).

Preferably, the $1^{st}$ node includes a base station, the base station controls each of a plurality of the nodes, and each of a plurality of the nodes is connected with the base station by wire.

Preferably, the user equipment includes a plurality of user equipments.

In another aspect of the present invention, a $1^{st}$ node, which allocates at least one portion of a plurality of nodes to a user equipment in a multi-node system including a plurality of the nodes connected to each other, according to the present invention includes a receiving module receiving a $1^{st}$ information on a location of the user equipment from a $2^{nd}$ node among a plurality of the nodes, a processor determining a preset number of node candidates located close to the user equipment among a plurality of the nodes using the received $1^{st}$ information, and a transmitting module transmitting information on the node candidates to the user equipment to allocate at least one of the node candidates to the user equipment under the control of the processor.

Preferably, the preset number is determined by a formula as follows: $N_c=2^N-1$, wherein the Nc and the N indicate the preset number and the number of a plurality of the nodes, respectively.

Preferably, the $1^{st}$ node includes a base station, the base station controls each of a plurality of the nodes, and each of a plurality of the nodes is connected with the base station by wire.

In a further aspect of the present invention, in a multi-node system including a plurality of nodes connected to each other, a user equipment, which receives allocation of at least one portion of a plurality of the nodes from a $1^{st}$ node among a plurality of the nodes, according to the present invention includes a transmitting module transmitting a $1^{st}$ information on a location of the user equipment to a $2^{nd}$ node among a plurality of the nodes, a receiving module receiving information on a preset number of node candidates located close to the user equipment among a plurality of the nodes from the $1^{st}$ node, and a processor controlling the transmitting module and the receiving module to transceive data with at least one of the node candidates.

Preferably, the preset number is determined by a formula as follows: $N_c=2^N-1$, wherein the Nc and the N indicate the preset number and the number of a plurality of the nodes, respectively.

Accordingly, the present invention provides the following effects and/or advantages.

First of all, an embodiment of the present invention provides a method and apparatus for efficiently transmitting and receiving signals using a node selectively by a sum rate analysis in a multi-node system, thereby securing efficient and optimized data transmission and reception.

Effects and/or advantages obtainable from the present invention may be non-limited the above mentioned effect.

And, other unmentioned effects and/or advantages can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is table of algorithm of a distance based selection mode using a sum rate analysis according to the present invention;

DETAILED DESCRIPTION OF THE INVENTION

Figure 1:
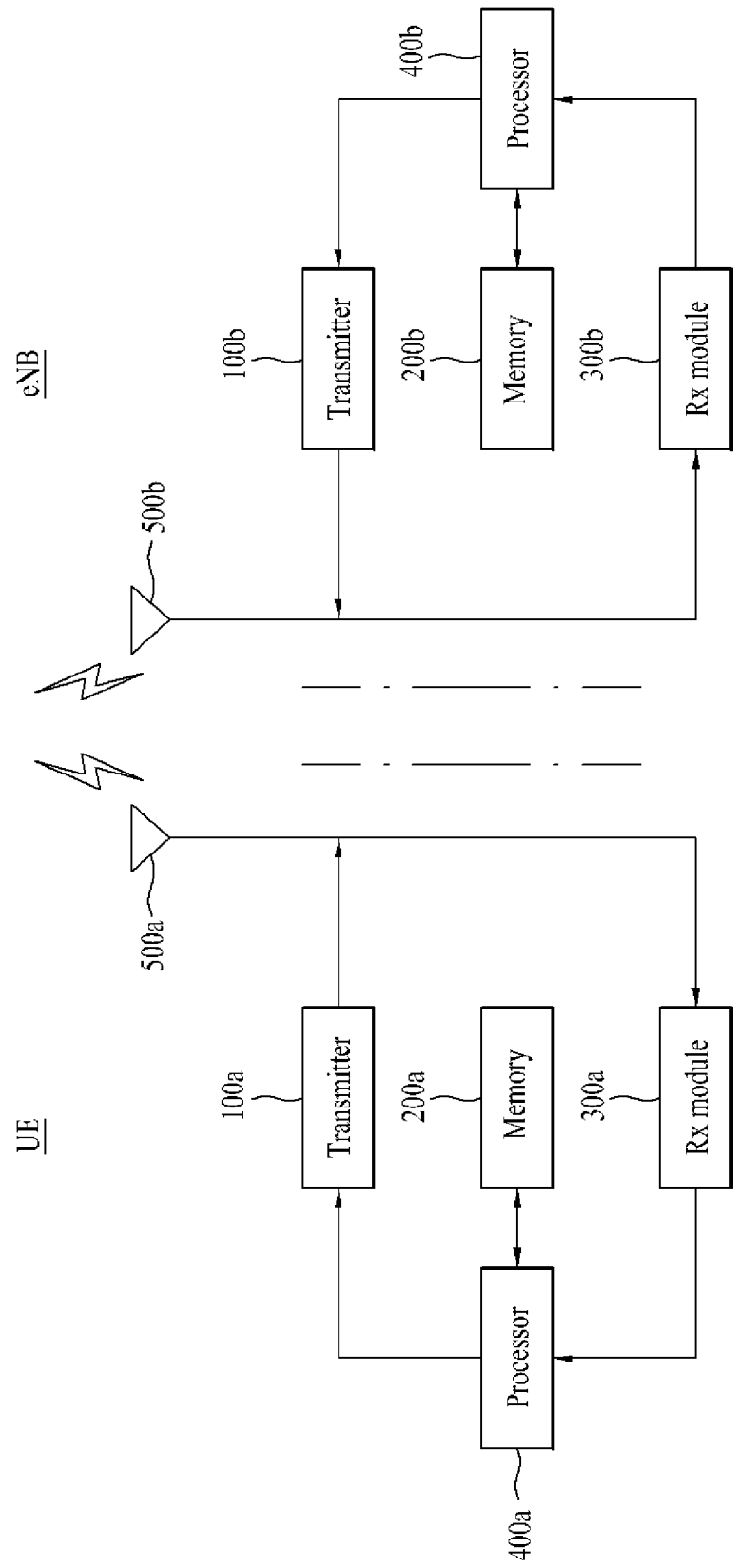
FIG. 1 is a block diagram for configuration of a user equipment and a base station according to the present invention.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

In the following detailed description of the invention includes details to help the full understanding of the present invention. Yet, it is apparent to those skilled in the art that the present invention can be implemented without these details. And, techniques, apparatuses (devices) and systems described in the following description may be applicable to various kinds of wireless multiple access systems. For example, the multiple access system may include one of CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented by such a wireless or radio technology as UTRA (universal terrestrial radio access), CDMA 2000 and the like. TDMA may be implemented with such a wireless technology as GSM (Global System for Mobile communications), GPRS (General Packet Radio Service), EDGE (Enhanced Data Rates for GSM Evolution) and the like. OFDMA may be implemented with such a wireless technology as IEEE (Institute of Electrical and Electronics Engineers) 802.11 (Wi-Fi), IEEE 802.16 (WiMAX), IEEE 802.20, E-UTRA (Evolved UTRA), etc. UTRAN is a part of UMTS (Universal Mobile Telecommunications System). 3GPP (3rd Generation Partnership Project) LTE (long term evolution) is a part of E-UMTS (Evolved UMTS) that uses E-UTRAN. The 3GPP LTE adopts OFDMA in downlink (DL) and SC-FDMA in uplink (UL). And, LTE-A (LTE-Advanced) is an evolved version of 3GPP LTE. For clarity, the following description mainly concerns a case that the present invention is applied to 3GPP LTE/LTE-A, by which the present invention is non-limited. For instance, although the detailed description of the invent may be based on a wireless communication system corresponding to 3GPP LTE/LTE-A system, it may be applicable to other random wireless communication systems except items unique to 3GPP LTE/LTE-A.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts.

Besides, in the following description, a terminal may be stationary or may have mobility. And, the terminal may be a common name of a device for transceiving various kinds of data and control informations by communicating with a base station. The terminal may be named one of a user equipment (UE), a mobile station (MS), a mobile terminal (MT), a user terminal (UT), a subscriber station (SS), a wireless device, a personal digital assistant (PDA), a wireless modem, a handheld device and the like.

A base station generally means a fixed station communicating with a terminal or other base stations and exchanges various kinds of data and control informations by communicating with a terminal and other base stations. The base station may be named such a terminology as eNB (evolvedNodeB), BTS (Base Transceiver System), ABS (Advanced Base station), BS (Base station), PS (Processing Server), RRH (Radio Remote Header), AP (Access Point) and the like.

In the present invention, if a specific signal is assigned to one of frame, subframe, slot, carrier and subcarrier, it may mean that a specific signal is transmitted in an interval or timing of frame/subframe/slot via corresponding carrier/subcarrier.

In the present invention, a rank or a transmission rank may mean the number of layers multiplexed with or allocated to one OFDM symbol or one resource element (RE).

FIG. 1 is a block diagram for configuration of a user equipment and a base station, to which the present invention is applied. In particular, a user equipment works as a transmitting device in UL or works as a receiving device in DL. On the contrary, a base station works as a receiving device in UL or works as a transmitting device in DL.

Referring to FIG. 1, a user equipment/base station UE/BS may include an antenna $500a/500b$ capable of transmitting and receiving information, data, signals and/or messages and the like, a transmitter $100a/100b$ transmitting information, data, signals and/or messages by controlling the antenna $500a/500b$, a receiver $300a/300b$ receiving information, data, signals and/or messages by controlling the antenna $500a/500b$ and a memory $200a/200b$ storing various kinds of informations within a wireless communication system temporarily or permanently. Moreover, the user equipment/base station may further include a processor $400a/400b$ controlling various components by being operatively connected to the components including the transmitter, the receiver, the memory and the like.

The transmitter $100a$, the receiver $300a$, the memory $200a$ and the processor $400a$ in the user equipment may be implemented with separate chips as independent components, respectively. Alternatively, at least two of the transmitter $100a$, the receiver $300a$, the memory $200a$ and the processor $400a$ in the user equipment may be implemented with a single chip. On the other hand, the transmitter $100b$, the receiver $300b$, the memory $200b$ and the processor $400b$ in the base station may be implemented with separate chips as independent components, respectively. Alternatively, at least two of the transmitter $100b$, the receiver $300b$, the memory $200b$ and the processor $400b$ in the base station may be implemented with a single chip. Alternatively, the transmitter and the receiver may be integrated into a single transceiver in the user equipment or the base station.

The antenna $500a/500b$ may play a role in externally transmitting a signal generated from the transmitter $100a/100b$. And, the antenna $500a/500b$ may play a role in receiving a signal from outside and then delivering the received signal to the receiver $300a/300b$. Moreover, the antenna $500a/500b$ may be called an antenna port. In this case, the antenna port may correspond to a single physical antenna or may be configured by a combination of a plurality of physical antennas. In case that MIMO (multi-input multi-output) function of transceiving data and the like using a plurality of antennas is supported by a transceiver, at least two antennas may be connected to the transceiver.

The processor $400a/400b$ may generally control overall operations of various components or modules in the mobile/base station. In particular, the processor $400a/400b$ may be able to perform various control functions to implement the above-described embodiments of the present invention, a MAC (medium access control) frame variable control function according to service characteristics and propagation environment, a power saving mode function of controlling an idle mode operation, a handover function, an authentication and encryption function and the like. And, the processor $400a/400b$ may be named one of a controller, a microcontroller, a microprocessor, a microcomputer and the like. Moreover, the processor $400a/400b$ may be implemented by hardware, firmware, software or a combination thereof.

In case of implementing the present invention using hardware, the processor $400a/400b$ may be provided with such a configuration to perform the present invention as ASICs (application specific integrated circuits), DSPs (digital signal processors), DSPDs (digital signal processing devices), PLDs (programmable logic devices), FPGAs (field programmable gate arrays), and the like.

In case of implementing the present invention using firmware or software, the firmware or software may be configured to include modules, procedures, and/or functions for performing the functions or operations of the present invention. And, the firmware or software configured to perform the present invention may be driven by the processor $400a/400b$ in a manner of being loaded in the processor $400a/400b$ or being saved in the memory $200a/200b$.

The transmitter $100a/100b$ may perform prescribed coding and modulation on a signal and/or data, which is scheduled by the processor $400a/400b$ or a scheduler connected to the processor $400a/400b$ and will be then transmitted externally, and may be then able to deliver the coded and modulated signal and/or data to the antenna 500a/500b.

The memory 200a/200b may store programs for processing and control of the processor 400a/400b and may be able to temporarily store input/output information. And, the memory 200a/200b may be utilized as a buffer. Moreover, the memory 200a/200b may include at least one of storage media including a flash type memory, a hard disk type memory, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Provided with the above configurations, a user equipment and a base station may perform various methods according to embodiments described in the following.

Figure 2:
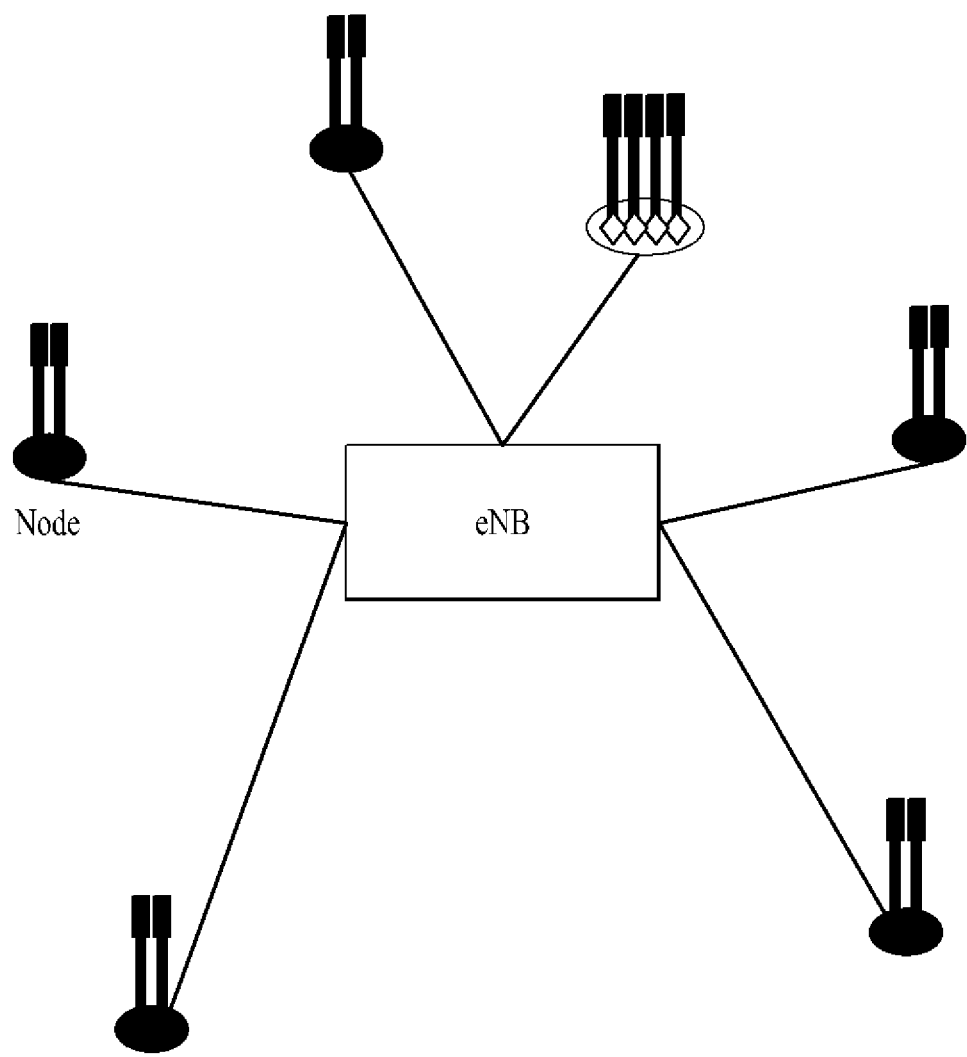
FIG. 2 is a diagram for one example of a multi-node (DAS) system according to the present invention.

FIG. 2 is a diagram for one example of a multi-node (DAS) system according to the present invention. In particular, FIG. 2 shows one example of a distributed multi-node system (hereinafter abbreviated DMNS) of DNS.

Referring to FIG. 2, in DMNS, a plurality of nodes located in a predetermined geographical area by being spaced apart from each other over a predetermined interval are connected to one base station or one base station controller via a cable or a dedicated circuit. In particular, one controller controls or manages transmissions and receptions via all nodes located within a predetermined geographical area.

Meanwhile, although FIG. 2 shows a case that one controller controls or manages transmissions and receptions via all nodes located within a predetermined geographical area, it is not mandatory for nodes of performing cooperative transmissions to be controlled by one controller only. And, the present invention may be applicable to a case that nodes controlled by different base stations or different base station controllers perform the cooperative transmissions. In particular, in a multi-node system according to the present invention, at least one base station or at least one base station controller connected with a plurality of nodes may control a plurality of the nodes in a manner that signals are simultaneously transmitted to a user equipment via some of the nodes or that a signal is simultaneously received from a user equipment via some of the nodes.

Although there is a difference between multi-node systems in accordance with substantiality of each node and implementation type of each node or the like, the multi-node systems differ from single node systems (e.g., CAS, conventional MIMO system, conventional relay node system, conventional repeater system, etc.) in that a plurality of nodes participate together in providing a communication service to a user equipment on predetermined time-frequency resources. Therefore, embodiments of the present invention relating to a method of performing cooperative transmission using a plurality of nodes entirely or in part may be applicable to multi-node system of various types. For instance, although a node generally indicates an antenna group located by being spaced apart from another node over a predetermined interval, the following embodiments of the present invention may apply to a case that a node means a random antenna group irrespective of such an interval. And, this antenna group may be substituted with one of an antenna port, an antenna pattern, an antenna configuration and the like.

Figure 3:
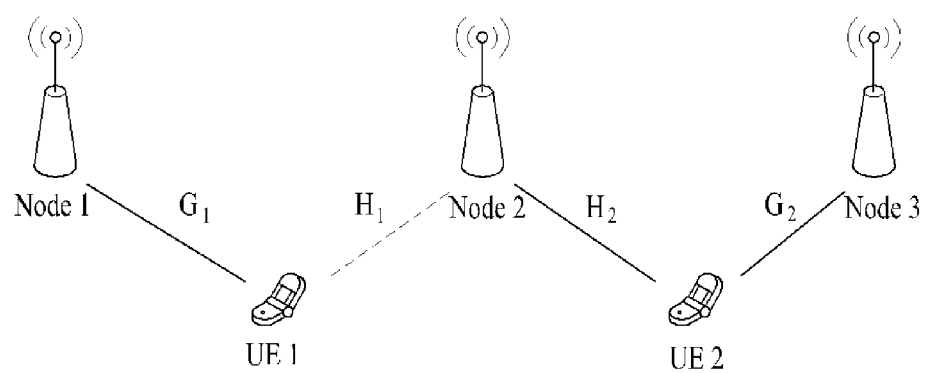
FIG. 3 is a diagram for one example of inter-node cooperative transmission according to the present invention.

FIG. 3 is a diagram for one example of inter-node cooperative transmission according to the present invention. First of all, in a multi-node system (DAS), multiple nodes perform transceiving with common user equipment(s) cooperatively and simultaneously or share information on a node affecting considerable interference with each other, whereby interference can be efficiently avoided or eliminated. By this scheme, the multi-node system (DAS) may have performance much better than a case of absence of cooperation between nodes.

For the efficient inter-node cooperative transmission, it may be able to use feedback information of a user equipment, i.e., channel state information transmitted by the user equipment. This feedback information may be primarily classified into two categories in accordance with a scheme of inter-node cooperative transmission. In the following description, feedback information of a user equipment according to an inter-node cooperative transmission scheme is explained in detail with reference to FIG. 3.

First of all, as a transmission scheme of transmitting data to a user equipment from a plurality of nodes in the same resource region, joint processing or multi-BS joint processing may be defined. For clarity and convenience of the following description, joint processing or multi-BS joint processing may be named JP. When JP is performed, a user equipment finds a channel value for each node and may then feed back channel state information based on the found channel value. In this case, the channel state information may include CQI (Channel Quality Indicator), PMI (Precoding Matrix Indicators), RI (Rank Indicator) and the like. In particular, the CQI indicates a signal to interference-noise ratio and may be represented as a power level (e.g., decibel) or MCS (modulation and coding) level. And, the PMI may indicate an index of a vector or matrix, which is a component of a codebook provided to a user equipment.

Referring to FIG. 3, assuming that node 1 and node 2 are cooperative transmission candidates for a user equipment 1, the user equipment 1 may be able to obtain channel values C1 and H1 by measuring channels of the node 1 and the node 2. Based on the obtained values, it may be able to find a precoding vector or matrix that enables a received signal strength to be maximized.

For instance, a value of V1 maximizing $\|G1V1\|$ is found and a value of W1 maximizing $\|H1W1\|^{\theta}$] is found. Moreover, it may be able to find a value $\Theta^{|\ominus}$ or $\theta$ that maximizes $\|G1V1+H1W1\Theta^{|\ominus}\|$. In this case, the value $\Theta^{|\ominus}$ or $\theta$ may be named CPMI (concatenating PMI). A precoding vector (e.g., V1, W1, etc.) is represented as PMI by being quantized into 3- to 6-bit value. Meanwhile, due to limitation of quantization, it may be difficult to represent a phase difference between nodes using PMI only. Hence, in IEEE 802.16m system for example of a wireless communication system, a phase is represented as $\Theta^{|\ominus}$, a $\theta$ value is defined in advance, and a corresponding index may be fed back as CPMI. In particular, PMI and CPMI of cooperative transmission node candidates may be transmitted for the inter-node cooperative transmission. And, it is apparent that CQI and RI can be transmitted together.

Meanwhile, in the IEEE 802.16m system, PMI and CPMI for each JP performing node are calculated and fed back by a user equipment. And, one CQI may be fed back by a user equipment to be referred to when cooperative transmission node candidates perform JP. In doing so, since the corresponding calculation is executed on the assumption that a rank is 1, the user equipment may not transmit RI (rank indicator).

Secondly, as a transmission scheme of avoiding interference by sharing information of an interference affecting node (or cell), it may define coordinated scheduling, coordinated beamforming, single-BS precoding with multi-BS coordination or the like. For clarity and convenience of the description in this specification, coordinated scheduling, coordinated beamforming, single-BS precoding with multi-BS coordination or the like may be generically named CS. According to the CS, a user equipment measures a channel of an interfering channel, calculates PMI having a biggest or smallest interference, and then delivers it to a serving node. Subsequently, the serving node notifies it to the interfering node. Hence, while data communications are performed between the serving node and the user equipment, the interfering node is restricted from using the PMI having the considerable interference or may be led to use the PMI having a small interference. Although the PMI is taken as an example, it is apparent that this scheme is identically applicable to all channel state informations.

The above-described multi-node system (DAS) is advantageous in extending coverage and raising a sum rate using a plurality of nodes. Compared to the conventional center-oriented communication system, the multi-node system (DAS) is able to use a plurality of nodes efficiently, thereby having advantages in aspect of power and capacitor.

Yet, unlike the conventional MIMO system, nodes of the multi-node system (DAS) may have different channel fadings. This is because signals transmitted to a plurality of nodes from a plurality of user equipments may experience independent large-scale fadings, respectively.

Therefore, in order to increase a sum rate by integrating the transmission techniques, the demand for a multi-node system (DAS) scheme is raising. In particular, considering independent large-scale fadings, an algorithm for a transmission mode selection is requested to maximize an ergodic sum rate based on path loss information.

Therefore, the present invention provides a method of performing a communication with a user equipment using prescribed node candidates selected from a plurality of node candidates applicable to a multi-node system (DAS).

In particular, according to the provided method, node candidates usable for an optimal mode are selectively selected from a plurality of node candidates applicable to a multi-node system (DAS) using information on a distance between a user equipment and a node. And, an efficient communication with the user equipment is then performed using the selected node candidates only.

In doing so, when a communication is performed in the multi-node system (DAS) using the selected node candidates only, it may be able to secure a maximum ergodic sum rate as well, which will be described in detail with reference to FIGS. 7 to 10.

Moreover, according to the present invention, by reducing a plurality of node candidates applicable to a multi-node system (DAS), it may be able to decrease complexity of calculation for finding a node-user combination having a maximum ergodic sum rate.

Generally, channel state information (hereinafter abbreviated CSI) may include channel state information (CSI) related to a distance between a user equipment, a node and instantaneous channel state information (CSI) and the like.

According to the present invention, node candidates applicable to a multi-node system (DAS) are determined using channel state information related to a distance between a user equipment and a node instead of using instantaneous channel state information. Therefore, the present invention is more advantageous than the conventional method in reducing load. In particular, it may be able to considerably reduce an applied feedback amount not using channel state information including both instantaneous channel state information and channel state information related to a distance between a user equipment but using channel state information related to a distance between a user equipment only.

In the following description, an ergodic sum rate applicable to a communication mode is preferentially described and a transmission mode selecting method proposed by the present invention is then explained in detail based on the described ergodic sum rate.

Figure 4:
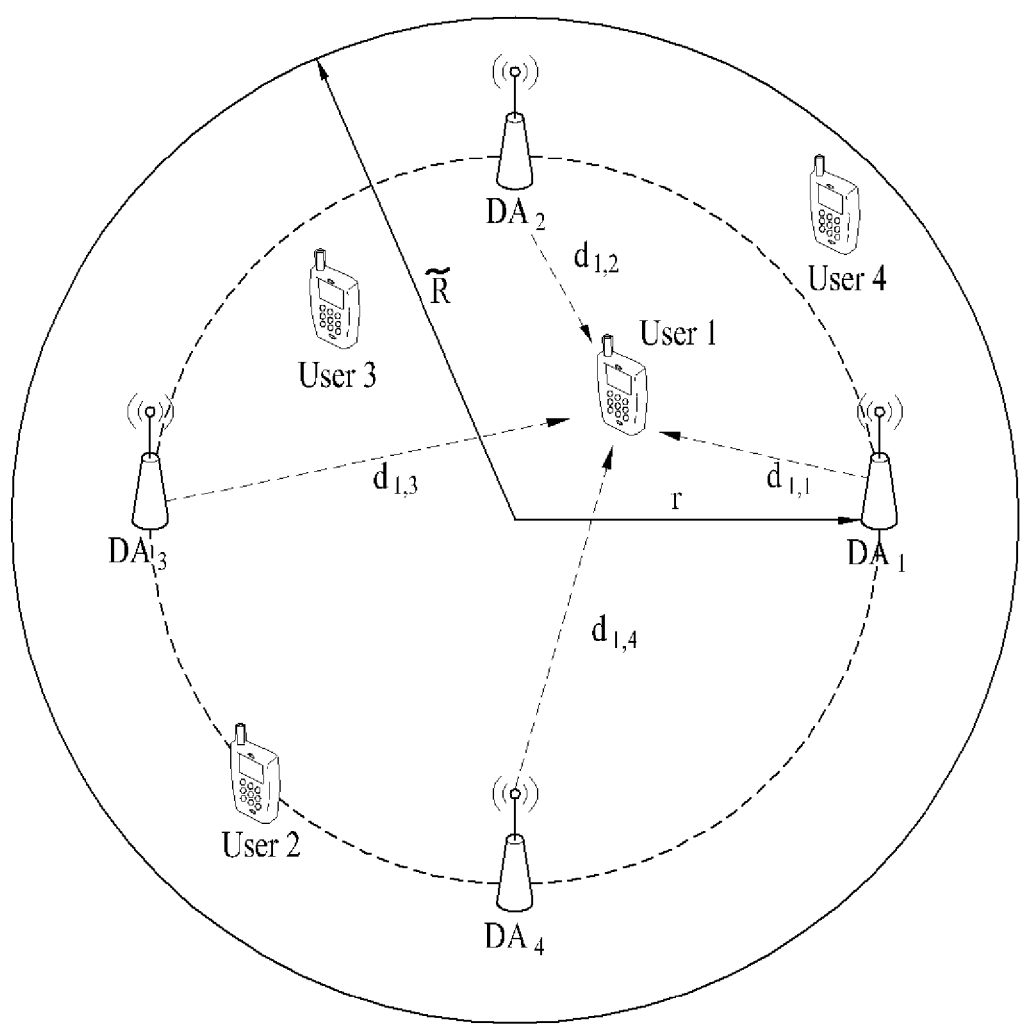
FIG. 4 is a diagram for another example of a multi-node (DAS) system according to the present invention.

FIG. 4 is a diagram for another example of a multi-node (DAS) system according to the present invention.

In FIG. 4, 'K' indicates an index of each user equipment and 'N' indicates an index of each node. Alternatively, 'K' may indicate a total number of user equipments and 'N' may indicate a total number of nodes.

Referring to FIG. 4, a multi-node system (DAS) may have a circular layout of $$R = \sqrt{\frac{7}{3}} r$$

and a position of $j^{th}$ node may become $$\left( r\cos\left(\frac{2\pi(j-1)}{N}\right), r\sin\left(\frac{2\pi(j-1)}{N}\right) \right) (j = 1, \ldots N),.$$

Yet, 'R', 'r' and the node position are just exemplary. And, the following description of the present invention may be applicable irrespective of detailed values of the R, r and node position.

Each node or user equipment may have a single antenna. And, each node may have an individual power constraint 'P' and transmit a signal with maximum power.

Every node may be able to exchange data with each user equipment, and more particularly, share information on a distance from a user equipment. Yet, channel state information may be shared with each other or may not.

In this case, it may be able to obtain the information on a distance between a user equipment and each node by measuring a received signal strength indicator. A signal received for $i^{th}$ user equipment may be represented as Formula 1. and, each parameter applied to Formula 1 may be represented as Table 1.

$$y_i = \sum_{j=1}^{N} \sqrt{S_{i,j} P} \, h_{i,j} x_j + z_i \text{ for } i = 1, 2, \ldots, K \quad \text{[Formula 1]}$$

TABLE 1

$x_j, z_i$ : data symbol and noise for i-th user
$S_{i,j} = d_{i,j}^{-p}$ : propagation pathloss due to the distance between
   the i-th user and the j-th DA port (p : pathloss exponent)
$h_{i,j}$: channel coefficient between i-th user and j-th DA port
P : transmit power In this case, $x_j$ and $z_i$ may indicate a data symbol and a nose for an $i^{th}$ user equipment, respectively. '$S_{i,j} = d_{i,j}^{-p}$' may mean a propagation pathloss due to the distance between the $i^{th}$ user equipment and the $j^{th}$ node and 'P' may indicate a pathloss exponent. And, '$h_{i,j}$' may mean a channel coefficient between the $i^{th}$ user equipment and the $j^{th}$ node. And, 'P' may indicate a transmission power. Moreover, let's assume $E[|x_i|^2]=1$, var $(z_i)=\sigma^2$.

Meanwhile, a pairing relation between N nodes and user equipments respectively supported by the nodes may be represented as 'D=[$u_1, \ldots, u_N$]'. In this case, applicable parameters may be represented as Table 2.

TABLE 2

D = [$u_1, \ldots, U_N$] : User index of N DA ports where $u_i \in \{0,1,\ldots, K\}$, (i = 1,...,N).
    The index 0 indicates that no user is supported by the corresponding DA.
$K_A, N_A$ : the number of active users and active DA ports. ($K_A \le N_A \le N$)
$G_i$ : Set of DA port indices supporting the i-th user.
$G_T = \cup_i G_i$ : Set of all active DA port indices.
$G_i^{RC} = G_T/G_i$ : Complement of $G_i$ in $G_T$.

In Table 2, it is '$\mu_i \in \{0, 1, \ldots, K\}$, (i=1, ..., N)' in D=[$u_1, \ldots, u_N$] and D means an index of a user equipment associated with N nodes. If an index is 0, it may mean that there is no user equipment supported by a node.

Moreover, $K_A$ and $N_A$ may mea the number of active user equipments and the number of active nodes, respectively.

$G_i$ means an index of a node supporting an $i^{th}$ user equipment. And, $G_T = \cup_i G_i$ may mean a set of indexes of all active nodes.

$G_i^{RC} = G_T/G_i$ may mean a complement of $G_i$ in $G_T$.

For instance, in a multi-node system (DAS) having N=4, D=[1 3 1 0] means that $1^{st}$ node and $3^{rd}$ node support a $1^{st}$ user equipment and that a $2^{nd}$ node supports a $3^{rd}$ user equipment. In this case, 2 active user equipments include the $1^{st}$ user equipment and the $3^{rd}$ user equipment and 3 active nodes indicate $1^{st}$ to $3^{rd}$ nodes. Hence, they may be represented as $K_A=2$ (user 1 & user 3) and $N_A=3$ ($DA_1, DA_2, DA_3$), respectively.

Moreover, the above situation may be represented as $G_1=\{1,3\}, G_2=\emptyset, G_3=\{2\}, G_4=\emptyset$ and $G_T=\{1, 2, 3\}$. Alternatively, the above situation may be represented as $G_1^{RC}=\{2\}, G_2^{RC}=\{1,2,3\}, G_3^{RC}=\{1,3\}, G_4^{RC}=\{1, 2,3\}$.

In the following description, based on the above description, an ergodic sum rate is explained.

First of all, an ergodic sum rate for small-scale fading may be represented as Formula 2.

$$E[R] = \sum_{i=1}^{K} E[R_i] = \sum_{i=1}^{K} E[\log_2(1 + \rho_i)]. \quad \text{[Formula 2]}$$

In Formula 2, $R_i$ and $\rho_i$ may mean a rate and SINR of an $i^{th}$ user equipment, respectively.

The rate $R_i$ of the $i^{th}$ user equipment may be generally represented as Formula 3.

$$R_i \equiv \log_2\left(1 + \frac{\rho_{i,S}}{\rho_{i,I}}\right) \quad \text{[Formula 3]}$$

$$= \log_2\left(1 + \frac{\sum_{k \in G_j} S_{i,k} P |h_{i,k}|^2}{\sigma_n^2 + \sum_{l \in G_i^{RC}} S_{i,l} P |h_{i,l}|^2}\right).$$

In Formula 3, $\rho_{i,S}$ and $\rho_{i,I}$ may indicate an instantaneous signal power of the $i^{th}$ user equipment and an interference plus noise power of the $i^{th}$ user equipment, respectively.

In this case, for the $i^{th}$ user equipment, signals from nodes in Gi are regarded as desired signals but signals received from nodes in $G_i^{RC}$ are regarded as interferences.

Moreover, when an $i^{th}$ user equipment is not supported by any node, if a corresponding user equipment rate is 0 and $K_A$ has a rate value that is not zero, it may be represented as $G_i = \emptyset$.

Meanwhile, in order to derive a closed form of an ergodic sum rate for small-scale fading, it may be necessary to consider PDF of SINR of each user equipment.

In case that $S_{i,j}$ ($i \in \{1, \ldots, K\}$, $j \in \{1, \ldots, N\}$) has a fixed value, for Formula 3, (weighted) Chi-squared distribution may apply to $\rho_{i,S}$ and $\rho_{i,I}$.

Hence, PDF of SINR of corresponding user equipments may be represented as Formula 4 and Formula 5.

$$f_{\rho_{i,S}}(\rho) = \sum_{k \in G_i} \left(\prod_{\substack{l \in G_i \\ l \ne k}} \frac{S_{i,k}}{S_{i,k} - S_{i,l}}\right) \frac{1}{S_{i,k}P} \exp\left(-\frac{\rho}{S_{i,k}P}\right) \text{ for } \rho > 0 \quad \text{[Formula 4]}$$

$$f_{\rho_{i,I}}(\rho) = \quad \text{[Formula 5]}$$
$$\sum_{u \in G_i^{RC}} \left(\prod_{\substack{v \in G_i^{RC} \\ v \ne u}} \frac{S_{i,u}}{S_{i,u} - S_{i,v}}\right) \frac{1}{S_{i,u}P} \exp\left(-\frac{\rho - \sigma_n^2}{S_{i,u}P}\right) \text{ for } \rho > \sigma_n^2.$$

In this case, if Jacobian Transformation is applied to Formula 4 and formula 5, it may be able to obtain PDF of SINR for an $i^{th}$ user equipment, as shown in Formula 6.

[Formula 6]

$$f_{\rho i}(\rho) = \int_{\sigma_n^2}^{\infty} f_{\rho i,S}(\rho\theta) f_{\rho i,I}(\theta)\theta d\theta$$

$$= \frac{1}{P^2} \sum_{k \in G_i} \sum_{u \in G_i^{RC}} \left(\prod_{\substack{l \in G_i \\ l \ne k}} \frac{S_{i,k}}{S_{i,k} - S_{i,l}}\right)\left(\prod_{\substack{v \in G_i^{RC} \\ v \ne u}} \frac{S_{i,u}}{S_{i,u} - S_{i,v}}\right).$$

$$\frac{1}{S_{i,k}S_{i,u}} \exp\left(\frac{\sigma_n^2}{S_{i,u}P}\right) \int_{\sigma_n^2}^{\infty} \exp\left(-\frac{(S_{i,u}\rho + S_{i,k})\theta}{S_{i,k}S_{i,u}P}\right)\theta d\theta$$

$$= \frac{1}{P} \sum_{k \in G_i} \sum_{u \in G_i^{RC}} \left(\prod_{\substack{l \in G_i \\ l \ne k}} \frac{S_{i,k}}{S_{i,k} - S_{i,l}}\right)\left(\prod_{\substack{v \in G_i^{RC} \\ v \ne u}} \frac{S_{i,u}}{S_{i,u} - S_{i,v}}\right).$$

$$\frac{\sigma_n^2(S_{i,u}\rho + S_{i,k}) + S_{i,k}S_{i,u}P}{(S_{i,u}\rho + S_{i,k})^2} \exp\left(-\frac{\sigma_n^2 \rho}{S_{i,k}P}\right).$$

In this case, an ergodic sum rate of an $i^{th}$ user equipment may be represented as Formula 8 using Formula 6 and integration formulas.

[Formula 7]

$$E[R_i] = \int_0^{\infty} \log_2(1 + \rho) f_{\rho i}(\rho) d\rho$$

$$= \frac{1}{\ln 2} \sum_{k \in G_i} \sum_{u \in G_i^{RC}} \left(\prod_{\substack{l \in G_i \\ l \ne k}} \frac{S_{i,k}}{S_{i,k} - S_{i,l}}\right)\left(\prod_{\substack{v \in G_i^{RC} \\ v \ne u}} \frac{S_{i,u}}{S_{i,u} - S_{i,v}}\right) \frac{S_{i,k}}{S_{i,k} - S_{i,u}} \cdot$$

$$\left\{\exp\left(\frac{\sigma_n^2}{S_{i,k}P}\right) Ei\left(\frac{\sigma_n^2}{S_{i,k}P}\right) - \exp\left(\frac{\sigma_n^2}{S_{i,u}P}\right) Ei\left(\frac{\sigma_n^2}{S_{i,u}P}\right)\right\}$$

Finally, an ergodic sum rate usable for a multi-node system (DAS) may be obtained in a manner of substituting Formula 7 for Formula 2.

This is described in detail with reference to FIG. 5 as follows.

Figure 5:
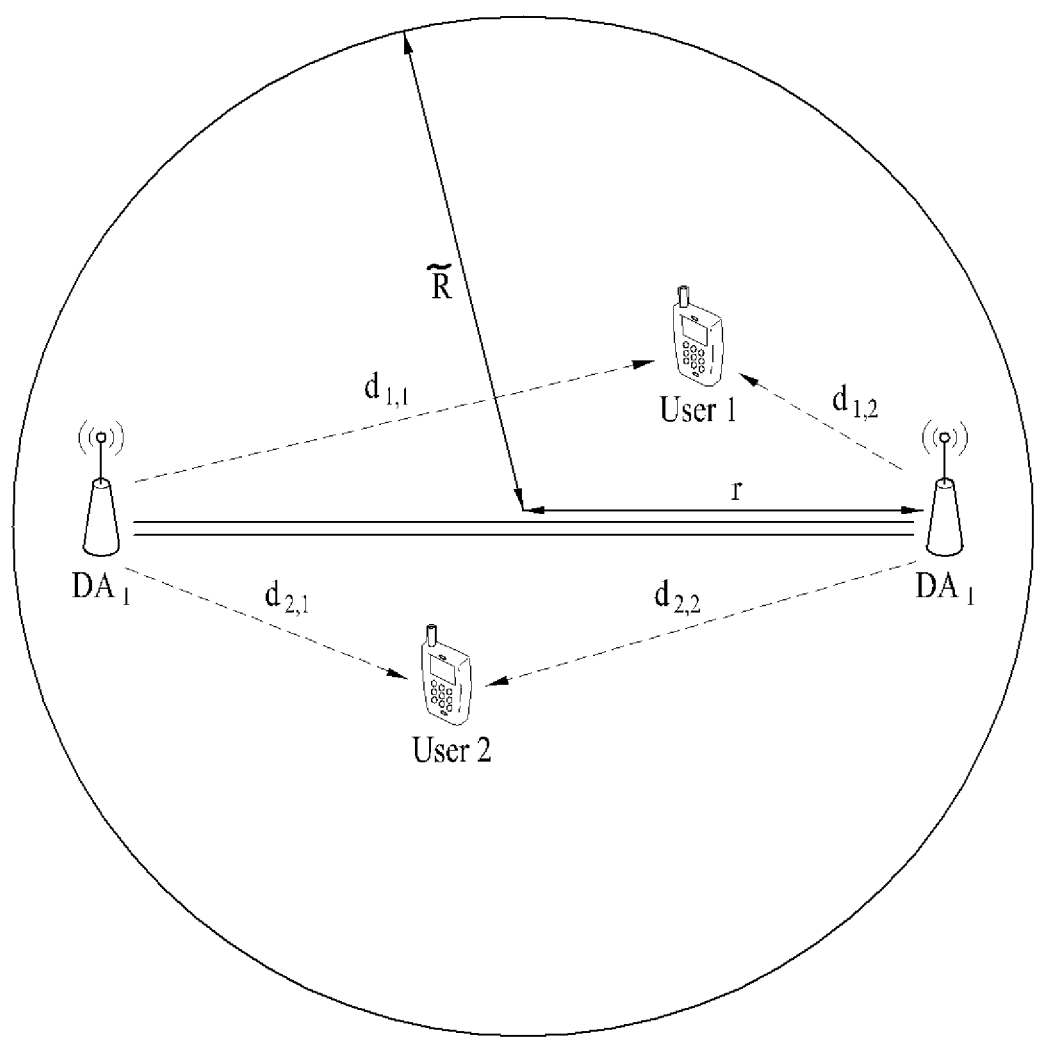
FIG. 5 is a diagram for one example of a multi-node system (DAS) including 2 user equipments and two nodes according to the present invention.

FIG. 5 is a diagram for one example of a multi-node system (DAS) including 2 user equipments and two nodes according to the present invention. In FIG. 5, it becomes 'N=K=2'.

Referring to FIG. 5, assume a case of $K_A=1$ and $N_A=1$.

In this case, it may become D={[1,0], [0,1], [2,0], [0,2]}. In particular, if an active user equipment of '$K_A=1$' is a $1^{st}$ user equipment, a node supporting the $1^{st}$ user equipment may include a $1^{st}$ node or a $2^{nd}$ node. Moreover, if an active user equipment of '$K_A=1$' is a $2^{nd}$ user equipment, a node supporting the $2^{nd}$ user equipment may include a $1^{st}$ node or a $2^{nd}$ node.

And, assume a case of $K_A=1$ and $N_A=2$.

In this case, it may become D={[1, 1], [2, 2]}. In particular, if an active user equipment of '$K_A=1$' is a $1^{st}$ user equipment, both a $1^{st}$ node and a second node support the $1^{st}$ user equipment. Moreover, if an active user equipment of '$K_A=1$' is a $2^{nd}$ user equipment, both a $1^{st}$ node and a second node support the $2^{nd}$ user equipment.

Assuming a case of D=[2, 1], it may be able to calculate an ergodic sum rate applicable to a multi-node system (DAS). In this case, 'D=[2, 1]' may be represented as $G_1=\{2\}$, $G_2=\{1\}$, $G_1^{RC}=\{1\}$ and $G_2^{RC}=\{2\}$ as well.

Through the following step, Formula 7 may be substituted for Formula 1.

In particular, an ergodic sum rate for 'D=[2, 1]' may be represented as follows:

$$E[R] = E[R_1] + E[R_2]$$
$$= \frac{1}{\ln 2}\left[\frac{S_{1,2}}{(S_{1,2}-S_{1,1})}\left\{\exp\left(\frac{\sigma_n^2}{S_{1,2}P}\right)Ei\left(\frac{\sigma_n^2}{S_{1,2}P}\right) - \exp\left(\frac{\sigma_n^2}{S_{1,1}P}\right)Ei\left(\frac{\sigma_n^2}{S_{1,1}P}\right)\right\} + \frac{S_{2,1}}{(S_{2,1}-S_{2,2})}\right.$$
$$\left\{\exp\left(\frac{\sigma_n^2}{S_{2,1}P}\right)Ei\left(\frac{\sigma_n^2}{S_{2,1}P}\right) - \exp\left(\frac{\sigma_n^2}{S_{2,2}P}\right)Ei\left(\frac{\sigma_n^2}{S_{2,2}P}\right)\right\}\right].$$

On the contrary, in case of D=[1, 1], an ergodic sum rate may be represented as follows:

$$E[R] = E[R_1]$$
$$= \frac{1}{\ln 2}\left\{\frac{S_{1,1}}{(S_{1,1}-S_{1,2})}\exp\left(\frac{\sigma_n^2}{S_{1,1}P}\right)Ei\left(\frac{\sigma_n^2}{S_{1,1}P}\right) + \frac{S_{1,2}}{(S_{1,2}-S_{1,1})}\exp\left(\frac{\sigma_n^2}{S_{1,2}P}\right)Ei\left(\frac{\sigma_n^2}{S_{1,2}P}\right)\right\}.$$

Hence, closed type formulas for other communication modes may be simplified using the aforementioned formulas.

Accuracy for the derived formulas may be checked using Monte Carlo simulation shown in Table 3.

TABLE 3

| Parameter | Value |
| --- | --- |
| Number of DA ports (N) & users (K) | 2/2 |
| Number of Tx/Rx antennas | 1/1 |

TABLE 3-continued

| Parameter | Value |
| --- | --- |
| User distribution | Uniformly distributed |
| Number of ch. realizations | 5000 |
| Pathloss exponent (p) | 3 |
| Cell radius | 6.5 (km) |
| Location of DA ports | (4, 0), (−4, 0) |
| Location of users (fixed) | (−2.5, 5), (3, 4.5) |
| Channel coefficients | $h_i \sim N(0, \sigma^2)$, i.i.d |
| Antenna power constraint | P |
| SNR | $P/\sigma^2$ |

In the following description, transmission selection algorithm of the present invention is explained in detail based on the aforementioned ergodic sum rate.

First of all, in order to select an optimized transmission mode among a plurality of transmission modes applicable to a multi-node system (DAS), it should consider whether a high ergodic sum rate is guaranteed.

In doing so, in order to maximize an ergodic sum rate, paring between active nodes and users supported by the active nodes should be first taken into consideration.

First of all, in case of $K_A=1$, if one user equipment is supported by all N active nodes, it may show performance better than a case that the user equipment is always supported by some of the nodes.

For instance, in a multi-node system (DAS) of 'N=K=2', it is apparent that Mode of $N_A=2$ has a sum rate higher than that of a mode of $N_A=1$.

In particular, compared to D=[1, 0], D=[1, 1] has an additional signal power transmitted from a $2^{nd}$ node. Hence, it may have a higher sum rate.

In aspect of ergodic sum rate maximization, it may be unnecessary to consider one user equipment transmission mode of $N_A=1$.

Hence, a set D of node candidates in a multi-node system (DAS) of 'N=K=2' may be represented as D={[1, 1], [2, 2], [1, 2], [2, 1]}. If this is applied to N and K arbitrarily, D may be represented as Formula 8.

$$(K+1)^N - K(2^N - 2) - 1 \quad \text{[Formula 8]}$$

Formula 8 may be obtainable because one user equipment transmission mode having '$N_A=1, 2, \ldots, N-1$' needs not to be considered for a transmission mode selection problem.

Referring to Formula 8, it may be observed that D required for an ideal mode transmission selection increases exponentially in accordance with N.

Therefore, the present invention provides a method of selecting an optimal mode using D that is decreased in accordance with decreasing N.

In particular, considering a fact that an overall sum rate is mostly determined by nodes in the vicinity of a user equipment, the present invention proposes a method of decreasing N and D by reducing a node candidate group applied using a distance between the user equipment and each of the nodes.

In this case, although ideal D may be represented as Formula 8, real D may be represented as Table 4.

TABLE 4

| | # of mode candidates |
| --- | --- |
| Ideal mode selection | $(k+1)^N - K(2^N - 2) - 1$ |
| Proposed mode selection | $2^N - N$ |

A method proposed by the present invention is described in detail as follows.

First of all, assume that there is a multi-node system (DAS) including K user equipments and N nodes.

In order to provide information helpful for a service provider to operate and manage a network as well as support mobility, each of the user equipments performs measurement for specific purpose set by the network and may be then able to report a corresponding measurement result to a plurality of nodes or base stations. In case that a prescribed one of the nodes receives the measurement result from the corresponding user equipment, the received measurement result may be shared with other nodes. For instance, a user equipment may receive broadcast information of a specific cell determined by a network. Based on the received broadcast information, the user equipment may be able to report a cell identity of the specific cell (named a global cell identity), location identification information of an area to which the specific cell belongs (e.g., tracking are code, etc.) and/or other cell information (e.g., member or non-member of CSG (closed subscriber group) cell, etc.).

In this case, it may be able to turn off nodes in a distance one by one in consideration of a distance between the user equipment and each of the nodes in accordance with the location identification information received from the user equipment.

In doing so, a subject of turning off the distant nodes one by one may include one of a plurality of the nodes. Alternatively, in order to prevent a prescribed node from being turned off, in case that a base station exists in the multi-node system (DAS), the base station becomes the subject to turn off the distant nodes one by one.

In particular, the turn-off operation may be performed until the number of the node candidates reaches $2^N-1$. Yet, it may exclude a case that all node candidates are turned off.

Thereafter, $(2^N-1)$ candidates are finally added to D.

Hence, the final $(2^N-1)$ D informations are transmitted to the user equipment by the base station or a prescribed node. Using the nodes contained in the received D information, the user equipment may be then able to perform data communication.

Meanwhile, in a multi-node system (DAS) of '$N_A=1$', since it may provide performance lower than that of a case of a user equipment supported by a plurality of nodes, the case of '$N_A=1$' may be excluded from the D of the present invention.

In order to substitute the communication mode of '$N_A=K_A=1$' excluded from the D of the present invention, a method of operating all N nodes for one user equipment is additionally provided. In this case, the user equipment is handed as a unique user equipment present within a minimum distance among all user equipments and nodes.

In particular, according to the present invention, in a multi-node system (DAS) including K user equipments and N nodes, D has a size of $(2^N-1)$, a case of '$N_A=1$' is excluded, and one user equipment transmission mode of '$N_A=N$' may be added.

In this case, it may be able to select an optimal mode having D, which shows a maximum ergodic sum rate, based on the aforementioned formulas.

The above-described algorithm according to the present invention may be represented as FIG. 6.

FIG. 6 is table of algorithm of a distance based selection mode using a sum rate analysis according to the present invention.

Figure 7:
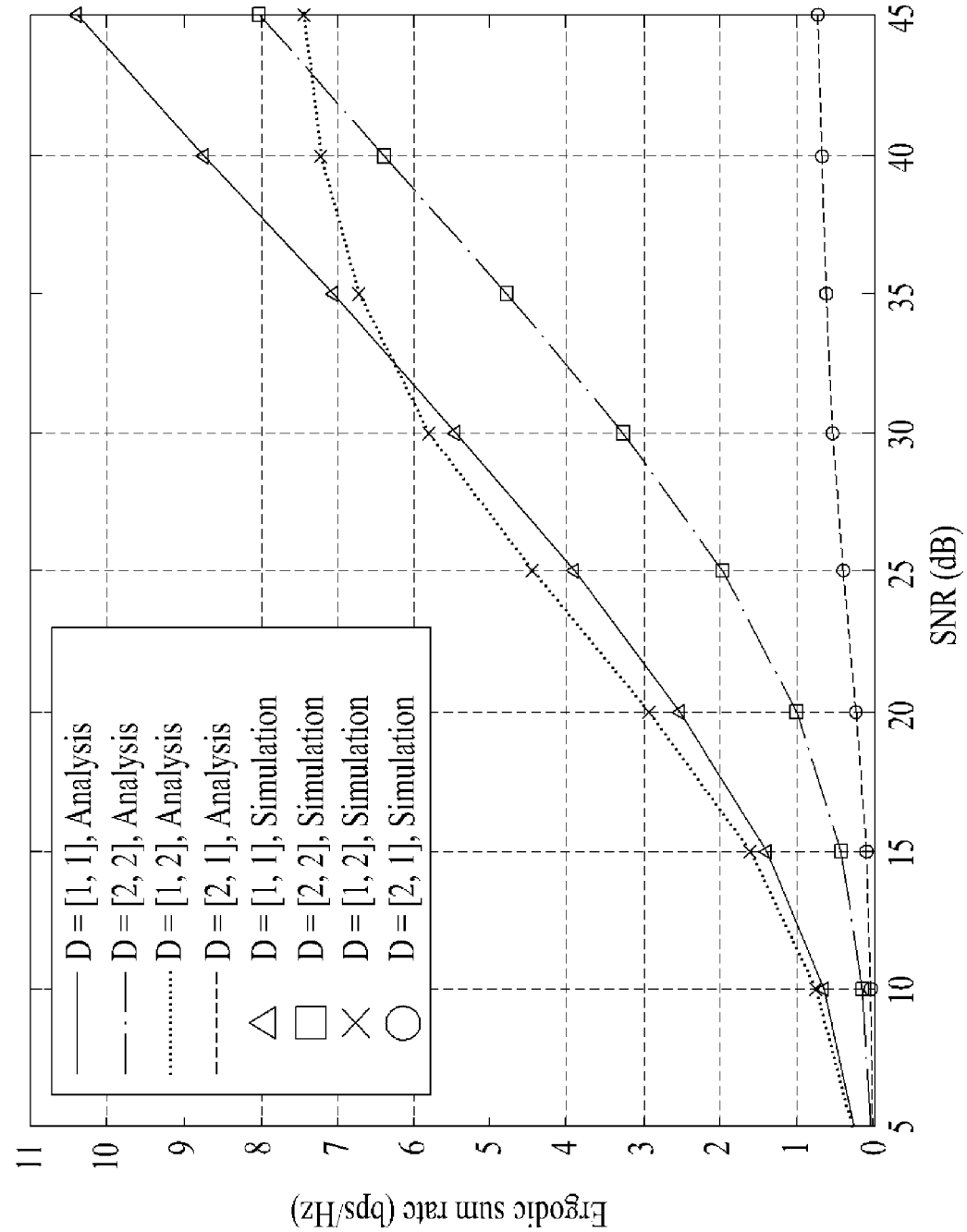
FIG. 7 is a graph of an ergodic sum rate of a multi-node system (DAS) including 2 user equipments and 2 nodes.

FIG. 7 is a graph of an ergodic sum rate of a multi-node system (DAS) including 2 user equipments and 2 nodes.

In FIG. 7, assume that positions of 2 nodes are set to (4, 0) and (−4, 0), respectively and that positions of 2 user equipments are set to (−2.5, −2) and (2, 4.5), respectively.

Referring to FIG. 7, it is observed that an ergodic sum rate formula derived in this specification exactly matches a simulation result.

Referring to FIG. 7, it is observed that there are cross-over points among different modes. And, it is also observed that an optimal mode to maximize an ergodic sum rate varies in accordance with SNR.

Sum rate curves for the modes have different trends in accordance with locations of user equipments, respectively. In particular, 'D=[1, 2]' becomes an optimal mode to maximize an ergodic sum rate in a low SNR region or an intermediate SNR region. Yet, 'D=[1, 1]' becomes an optimal mode to maximize an ergodic sum rate in a high SNR region over 33 dB.

Considering these facts, the necessity for the transmission selecting method proposed by the present invention further increases.

In the following description, one example of a detailed case of applying algorithm of a distance based selection mode is explained.

First of all, assuming a multi-node system (DAS) of 'N=K=5', if Formula 8 is applied, D may become 7,625.

On the other hand, if $(2^N-1)$ of the present invention is applied, D may become 27. Hence, it can be observed that a size of D decreases considerably.

Moreover, as mentioned in the following description with reference to FIGS. 8 to 10, sum rate performance in accordance with $(2^N-1)$ may maintain the same sum rate performance according to Formula 8, it is efficient.

Besides, according to the present invention, it may be able to determine node candidates applicable to a multi-node system (DAS) not using channel state information including channel state information related to a distance between a user equipment and instantaneous channel state information but using channel state information related to a distance between a user equipment only. Therefore, the present invention may have load reduced smaller than that of the conventional method.

Figure 8:
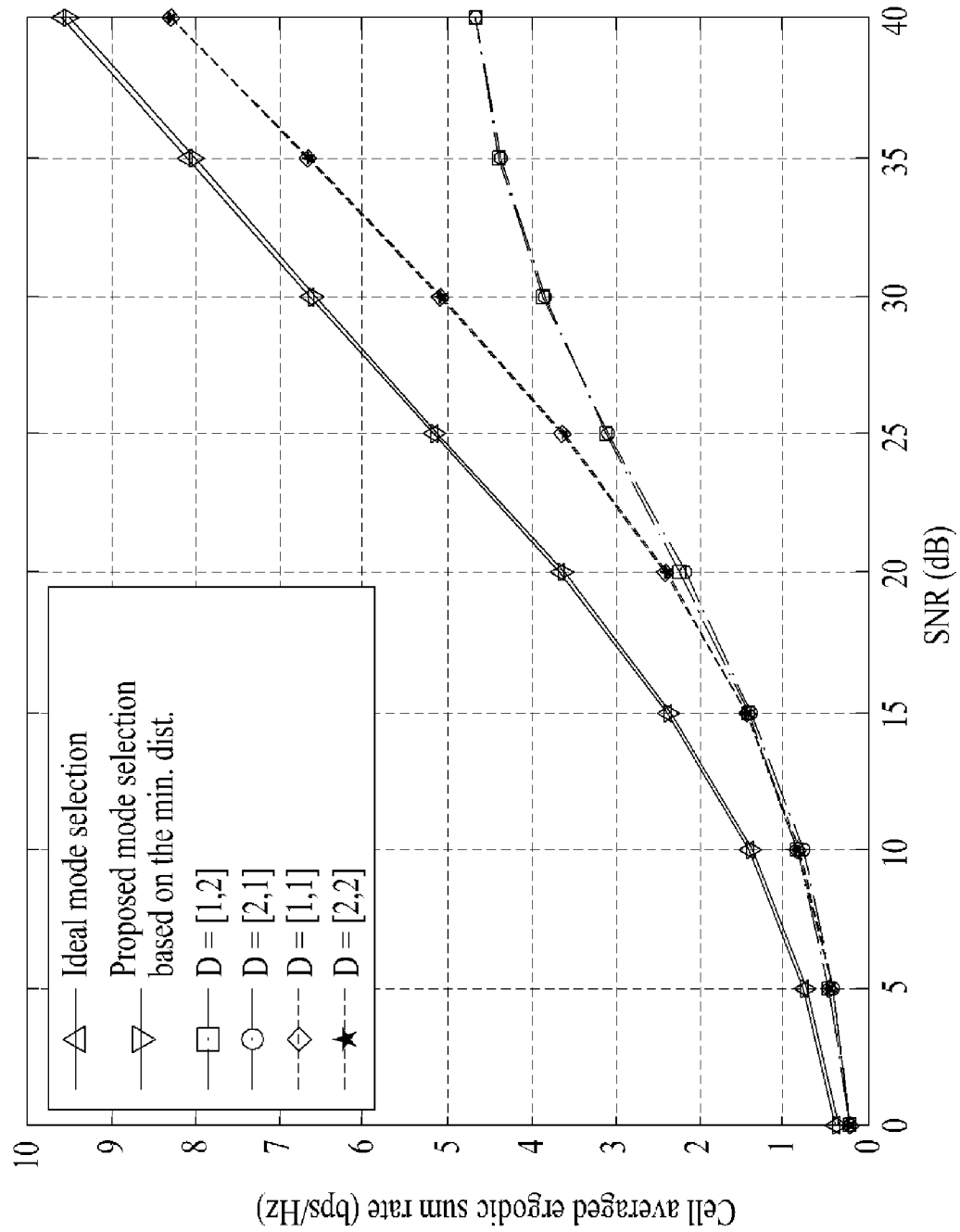
FIG. 8 is a graph of an averaged ergodic sum rate of a multi-node system (DAS) including 2 user equipments and 2 nodes.

FIG. 8 is a graph of an averaged ergodic sum rate of a multi-node system (DAS) including 2 user equipments and 2 nodes.

In FIG. 8, assume that user equipments are generated randomly with uniform distribution. Assume that a cell averaged ergodic sum rate is calculated for exact estimation of location based performance. And, assume that the number of simulations for user equipments is set to 4,000.

Referring to FIG. 8, a cell averaged ergodic sum rate of a transmission selecting method proposed by the present invention is shown if 'N=K=2'. Moreover, in order to confirm performance of a transmission selecting method proposed by the present invention, a cell averaged ergodic sum rate of an ideal mode is shown in FIG. 8 as well.

Referring to FIG. 8, it may be observed that a cell averaged ergodic sum rate, to which a transmission selecting method proposed by the present invention is applied, is equal to that of an ideal case.

Since all user equipments are averagely present in a cell, a case of D=[1, 2] and D=[2, 1] has the same performance of a case of d=[1, 1] and d=[2, 2].

At low SNR, an averaged sum rate in 1-UE transmission mode of '$K_A=1$' has the same value of an averaged sum rate in 2-UE transmission mode of '$K_A=2$'. Yet, saturated performance is observed at high SNR. This is because interference power of other user equipments may considerably decrease sum rage performance at high SNR in which interference becomes a dominant factor.

Moreover, referring to FIG. 8, it may be able to confirm that a curve according to the present invention may use a selection gain rather than a fixed transmission mode.

Figure 9:
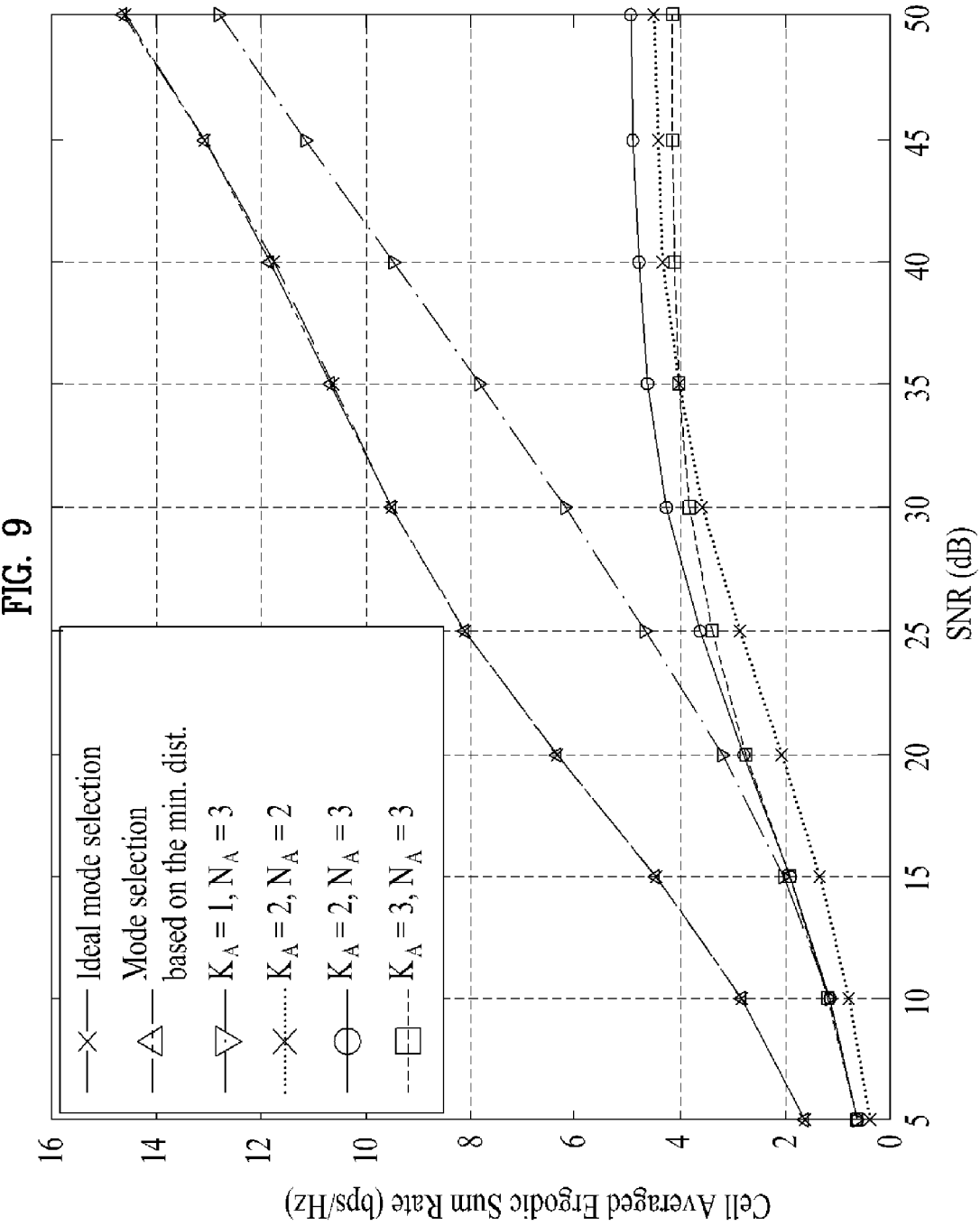
FIG. 9 is a graph of an averaged ergodic sum rate of a multi-node system (DAS) including 3 user equipments and 3 nodes.

FIG. 9 is a graph of an averaged ergodic sum rate of a multi-node system (DAS) including 3 user equipments and 3 nodes. For clarity and convenience of the following description, the assumptions taken for FIG. 8 are maintained intact in FIG. 9.

Referring to FIG. 9, in a high SNR region, like FIG. 8, cell averaged ergodic sum rate performance of 1-UE transmission mode seems close to that of an ideal mode selection. This is because 1-UE transmission has performance has performance better than that of plural-UE transmission in an interference limited environment.

Figure 10:
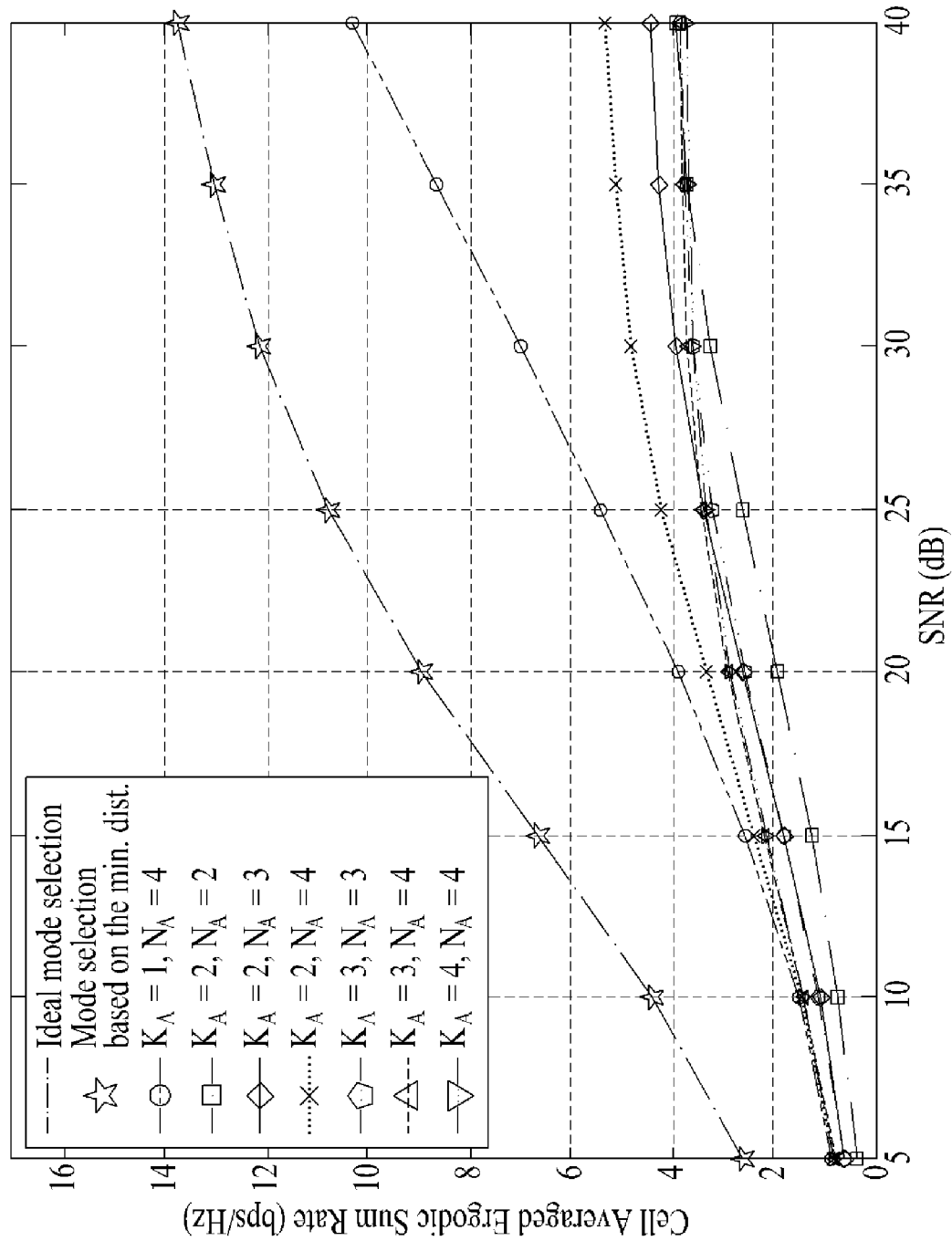
FIG. 10 is a graph of an averaged ergodic sum rate of a multi-node system (DAS) including 4 user equipments and 4 nodes.

FIG. 10 is a graph of an averaged ergodic sum rate of a multi-node system (DAS) including 4 user equipments and 4 nodes.

Referring to a high SNR region shown in FIG. 10, a curve for plural-UE transmission mode has a flat pattern, whereas a sum rate for 1-UE transmission mode has the almost same pattern of an ideal mode selection.

The less the active user equipments exist, the higher the number of active nodes increases. Hence, mode performance for a plurality of user equipments is saturated with a higher ergodic sum rate value. Simultaneously, an ergodic sum rate gain obtained by a mode selecting method proposed by the present invention increases in proportion of N or K.

Referring to FIG. 9 or FIG. 10, a minimum distance based mode selecting method according to the present invention may be useful in causing no performance degradation and decreasing the number of mode candidates considerably. In particular, set sizes of mode candidates in the ideal cases shown in FIG. 9 and FIG. 10 are 45 and 568, respectively. On the other hand, if the present invention is applied, the set size of the mode candidates is considerably reduced to 5 or 12. Hence, the number of pairing user equipments and nodes may be considerably increased by the effect attributed to the reduction of the candidate set size.

Moreover, a user equipment may not perform signal measurement on a turned-off node. Therefore, a corresponding load on the user equipment may be additionally reduced.

Accordingly, a method of transmitting and receiving channel sate information according to the present invention is available for various wireless communication systems such as 3GPP LTE/LTE-A, IEEE 802 and the like.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for allocating at least one of a plurality of nodes to a user equipment at a first node of the plurality of nodes in a multi-node system wherein the plurality of nodes are connected to each other, the method comprising:
receiving first information about a location of the user equipment from a second node of the plurality of nodes;
determining a preset number of node candidates located close to the user equipment among the plurality of nodes using received first information; and
transmitting information about the node candidates to the user equipment to allocate at least one of the node candidates to the user equipment,
wherein preset number is determined by a following formula:
$N_c=2^N-1$, wherein $N_c$ indicates the preset number and N indicates the number of the plurality of nodes.

2. The method of claim 1, wherein the plurality of nodes comprise a macro base station, a pico cell base station (PeNB), a home base station (HeNB), RRH (remote radio head), a relay node, an antenna, and a distributed antenna group.

3. The method of claim 1, wherein the first information does not contain instantaneous channel state information (CSI).

4. The method of claim 1, wherein the first node comprises a base station, wherein the base station controls each of the plurality of nodes, and wherein each of the plurality of nodes is connected with the base station by wire.

5. The method of claim 1, wherein the user equipment comprises a plurality of user equipments.

6. A method for receiving information to allocate at least one of a plurality of nodes at a user equipment from a first node of the plurality of nodes in a multi-node system wherein the plurality of nodes are connected to each other, the method comprising:
transmitting first information about a location of the user equipment to a second node of the plurality of nodes;
receiving information about a preset number of node candidates located close to the user equipment among the plurality of nodes from the first node; and
transceiving data with at least one of the node candidates,
wherein preset number is determined by a following formula:
$N_c=2^N-1$, wherein $N_c$ indicates the preset number and N indicates the number of the plurality of nodes.

7. The method of claim 6, wherein the plurality of nodes comprise a macro base station, a pico cell base station (PeNB), a home base station (HeNB), RRH (remote radio head), a relay node, an antenna, and a distributed antenna group.

8. The method of claim 6, wherein the first information does not contain instantaneous channel state information (CSI).

9. The method of claim 6, wherein the first node comprises a base station, wherein the base station controls each of plurality of nodes, and wherein each of the plurality of nodes is connected with the base station by wire.

10. The method of claim 6, wherein the user equipment includes a plurality of user equipments.

11. A node configured to allocate at least one of a plurality of nodes to a user equipment in a multi-node system wherein the plurality of nodes are connected to each other, the node comprising:
  a receiving module receiving first information about a location of the user equipment from another node of the plurality of nodes;
  a processor determining a preset number of node candidates located close to the user equipment among the plurality of nodes using received first information; and
  a transmitting module transmitting information about the node candidates to the user equipment to allocate at least one of the node candidates to the user equipment under control of the processor,
  wherein the preset number is determined by a following formula:
  $N_c=2^N-1$, wherein $N_c$ indicates preset number and N indicates the number of the plurality of nodes.

12. The node of claim 11, wherein the node comprises a base station, wherein the base station controls each of the plurality of nodes, and wherein each of the plurality of nodes is connected with the base station by wire.

13. A user equipment configured to receive information to allocate at least one portion of a plurality of nodes from a first node of the plurality of nodes in a multi-node system wherein the plurality of nodes are connected to each other, the user equipment comprising:
  a transmitting module transmitting first information about a location of the user equipment to a second node of the plurality of nodes;
  a receiving module receiving information about a preset number of node candidates located close to the user equipment among the plurality of nodes from the first node; and
  a processor controlling the transmitting module and the receiving module to transceive data with at least one of the node candidates,
  wherein the preset number is determined by a following formula:
  $N_c=2^N-1$, wherein $N_c$ indicates the preset number and N indicates the number of the plurality of nodes.

14. The node of claim 11, wherein the plurality of nodes comprise a macro base station, a pico cell base station (PeNB), a home base station (HeNB), RRH (remote radio head), a relay node, an antenna, and a distributed antenna group.

15. The node of claim 11, wherein the first information does not contain instantaneous channel state information (CSI).

16. The user equipment of claim 13, wherein the plurality of nodes comprise a macro base station, a pico cell base station (PeNB), a home base station (HeNB), RRH (remote radio head), a relay node, an antenna, and a distributed antenna group.

17. The user equipment of claim 13, wherein the first information does not contain instantaneous channel state information (CSI).

18. The user equipment of claim 13, wherein the first node comprises a base station, wherein the base station controls each of the plurality of nodes, and wherein each of the plurality of nodes is connected with the base station by wire.

* * * * *